United States Patent
Linke et al.

(10) Patent No.: US 11,433,635 B2
(45) Date of Patent: Sep. 6, 2022

(54) PRIMARY REFLECTOR FOR A HEATING MODULE OF A HEATING DUCT IN A MOULDING MACHINE FOR MOULDING CONTAINERS FROM PREFORMS

(71) Applicant: KHS GmbH, Dortmund (DE)

(72) Inventors: Michael Linke, Hamburg (DE); Frank Lewin, Tangstedt (DE); Daniel Firchau, Mölln (DE); Deniz Ulutürk, Hamburg (DE); Niels Meyer, Schenefeld (DE)

(73) Assignee: KHS GmbH, Dortmund (DE)

( * ) Notice: Subject to any disclaimer, the term of this patent is extended or adjusted under 35 U.S.C. 154(b) by 353 days.

(21) Appl. No.: 16/644,403

(22) PCT Filed: Sep. 6, 2018

(86) PCT No.: PCT/EP2018/074041
§ 371 (c)(1),
(2) Date: Mar. 4, 2020

(87) PCT Pub. No.: WO2019/048560
PCT Pub. Date: Mar. 14, 2019

(65) Prior Publication Data
US 2020/0384716 A1  Dec. 10, 2020

(30) Foreign Application Priority Data
Sep. 8, 2017  (DE) .................. 10 2017 008 445.9

(51) Int. Cl.
*B29C 49/64*   (2006.01)
*B31B 50/59*   (2017.01)
(Continued)

(52) U.S. Cl.
CPC .......... *B31B 50/59* (2017.08); *B29C 35/0805* (2013.01); *B29C 49/6418* (2013.01);
(Continued)

(58) Field of Classification Search
CPC ........ B29C 2035/0822; B29C 35/0805; B29C 49/6418; B29C 49/6409; B29C 49/68; H05B 3/0057
See application file for complete search history.

(56) References Cited

U.S. PATENT DOCUMENTS

2009/0040782 A1   2/2009   Liu et al.
2016/0313009 A1*  10/2016  Pille ................ H05B 3/748
2017/0135153 A1   5/2017   Heuzebroc et al.

FOREIGN PATENT DOCUMENTS

DE   202004010454 U1   9/2004
FR      3022610 A1    12/2015
(Continued)

OTHER PUBLICATIONS

International Search Report dated Apr. 9, 2019 filed in PCT/EP2018/074041.

*Primary Examiner* — Robert B Davis
(74) *Attorney, Agent, or Firm* — Rankin, Hill & Clark LLP

(57) ABSTRACT

The invention relates to a heating module and a primary reflector for a heating module of a heating duct of a molding machine for producing containers from preforms, in which preforms made of thermoplastic are heated, which is provided between tubular heating units arranged in parallel and one over another on a side wall of the heating module and the side wall and consists of ceramic material, and is characterized in that the primary reflector is connected via a dovetail connection to the side wall, wherein a connecting region in the form of a dovetail is formed in each case on the reflector, which is fixable in each case with a clip made of steel, in particular spring steel, fastened on the side wall, having dimensions adapted to the dovetail.

13 Claims, 5 Drawing Sheets

(51) Int. Cl.
*B29C 35/08* (2006.01)
*B29C 51/18* (2006.01)
*B29L 31/00* (2006.01)

(52) U.S. Cl.
CPC ...... *B29C 51/18* (2013.01); *B29C 2035/0822* (2013.01); *B29L 2031/7158* (2013.01)

(56) References Cited

FOREIGN PATENT DOCUMENTS

| | | | | |
|---|---|---|---|---|
| WO | 9632244 | A1 | 10/1996 | |
| WO | 0162463 | A1 | 8/2001 | |
| WO | 2011036593 | A1 | 3/2011 | |
| WO | WO-2012172529 | A2 * | 12/2012 | ........... B29B 13/024 |
| WO | 2015193591 | A1 | 12/2015 | |

* cited by examiner

PRIMARY REFLECTOR FOR A HEATING MODULE OF A HEATING DUCT IN A MOULDING MACHINE FOR MOULDING CONTAINERS FROM PREFORMS

The invention relates to a heating module and to a primary reflector.

Heating modules of the type in question are typically provided in molding machines of containers from preforms, in which preforms made of thermoplastic are firstly heated and then brought into the desired form, for example, in the form of bottles, after heating by means of blow molding or by means of a filling material Such machines, which are also referred to as blow molding machines, generally have a circulating conveyor unit, using which the preforms are guided through a heating duct for thermal conditioning over a defined section of the transport path. In this case, the preforms or the region thereof plunging into the heating duct, respectively, are heated to temperatures above the glass transition point of the material to be processed. Similar facilities for temperature conditioning of the preforms are also used in machines in which molding and filling of a container from preforms takes place simultaneously.

Facilities in which, for example, continuous heating takes place are also conceivable, of course.

A heating duct is typically formed by at least one heating module, in the case of moving heating generally by multiple heating modules arranged in succession in the transport direction and connected to one another, wherein each heating module respectively forms one section of the heating duct.

Typical heating modules define a radiation chamber delimited by two opposing side walls, a bottom, and an upper cover. Heating elements are provided in the region of one of the side walls of the heating module, generally horizontally aligned tubular heating units arranged one over another in the vertical direction, which emit infrared radiation. A reflector provided on this side between the heating units and the side wall and referred to as a primary reflector ensures that radiation originating from the heating elements and oriented to the rear is reflected back into the heating module in the direction toward a preform. Instead of the term primary reflector, the term main reflector is also used in the technical literature.

Further reflector elements, which are typically referred to as counter reflector and bottom reflector, are provided on the opposite side and in the bottom region of the heating module.

The task of the reflectors is to ensure heating of preforms with the least possible heat loss in the heating module.

The reflectors can be produced from different materials, for example, aluminum or ceramic.

The invention is directed to reflectors, in particular primary reflectors, which consist of ceramic materials.

One problem is that ceramic components, for example, the mentioned reflectors, have relatively large production-typical size tolerances. In known heating modules, the reflectors are arranged in, for example, frames or rails, wherein excessively small reflectors wobble and have to be reworked to form large ones, which is relatively complex.

The object of the invention is to improve such heating modules in such a way that simpler mounting and fixing of the reflectors is possible.

A further object of the invention is to provide primary reflectors, using which a more effective yield of the radiation is achieved.

This object is achieved by a heating module as claimed herein and by a primary reflector as claimed herein.

The first aspect relates to the fastening, in particular of the primary reflector, on the side wall of the heating module. The primary reflector can also be constructed as described hereafter from individual segments which can be fastened accordingly. It is conceivable that a connecting region is formed on the rear side of the reflector or the segments, respectively, which can be inserted into a corresponding receptacle region on the side wall, for example, according to the tongue and groove principle. A connecting region in the form of a dovetail is particularly preferably formed on the reflector or the segments, which can be accommodated according to the invention as described hereafter in a corresponding clip made of steel, in particular spring steel, on the heating module. In particular if the clip is produced from thermally stable spring steel and is contoured accordingly, tolerances in the production of the reflector or the segments and possible thermal effects during the heating and cooling of the heating module may be well compensated for using such a connection.

This aspect is not necessarily restricted to primary reflectors, but rather also can be used in general in ceramic reflectors in the heating module, for example, the counter reflector and bottom reflector. These can be reflectors having typical shapes and properties in this case, or also the primary reflector described hereafter.

In a heating module provided according to this aspect of the invention, the connection between reflector or the reflector segments, respectively, and the side wall is accordingly produced via a dovetail connection having a universal clip made of steel, in particular spring steel, which accommodates the reflector or the segments, within the production-typical tolerances for ceramic materials, without the clip having to be adapted individually to each segment or each reflector for this purpose. The contour and pre-tension of the clip adapts itself to the dovetail and fixes the reflector or the segments via three contact surfaces.

One or more elastic intended bending regions can advantageously be provided in the clip. The term intended bending region means those regions in which the clip primarily elastically bends upon force action, while the other regions of the clip maintain their original alignment. The clip can thus compensate for tolerances in the dovetail and simultaneously can press against the dovetail flatly over the largest possible region and fix it effectively. Such intended bending regions can already be provided during the production of the clip, for example, in that a pre-bend is already provided there or the clip material is embodied as more flexible there in another manner.

Due to the use of an advantageously temperature-resistant spring steel, the reflector or the segments remain fixed by the clip even after temperature effects.

It is advantageous that a mass-produced clip made of spring steel can be used and no further forming is required for the joining of clip and dovetail.

It is furthermore advantageous that the clip is embodied longer than the dovetail to be held by it. In this case, not only is no shape fitting between dovetail and clamp provided, the clip is rather supposed to protrude beyond the dovetail and then be set back. In this manner, the elastic holding properties of the clamp are improved. The clip can be embodied, for example, 1 to 15%, preferably 2 to 10%, preferably more than 5% longer than the dovetail. This thus means that the region of the clip between its legs is longer than the spacing between upper edge and lower edge of the dovetail.

The second aspect of the invention relates to the primary reflector. According to the invention, it is accordingly provided that depressions or grooves separated by webs are provided in the primary reflector in the horizontal direction, i.e., in the conveyor direction of the transport path through the heating module. Profile and dimensioning of the grooves are selected so that a tubular heating unit can be arranged in each of them in such a way that the grooves enclose a part of the circumference of the tubular heating unit.

In general, the grooves are dimensioned in such a way that the wall regions thereof extend, for example, over half the circumference of the heating tubes. However, grooves which cover a smaller or larger region are also conceivable and obviously covered by the invention. It is also not required for the grooves to have a partially-circular profile. V-shaped profiles or polygonal profiles are obviously also conceivable, to mention only a few examples.

This also applies to the heating units. In general, in this case these will be tubular radiators. However, other shapes are obviously also conceivable.

In general, however, the invention relates to heating tubes arranged one over another and parallel to one another, which are each accommodated in a groove of the primary reflector arranged between them and the side wall.

One essential advantage of the invention is that the radiation oriented from the heating units to the rear, i.e., in the direction of the side wall, is reflected back bundled and substantially oriented into the radiation chamber of the heating module. Losses because of diffuse reflection as occur, for example, in the case of a reflector having glossy surface, are minimized in this case. The webs between the grooves are used in this case as shadow edges and ensure radiation delimitation.

The processing of ceramic materials is not unproblematic. With increasing size of the component, which is typically produced in the sintering method, for example, the risk of fracture and production-related manufacturing tolerances also increase.

One design of the invention therefore provides that the primary reflector does not consist of one piece, but rather of multiple partial segments. These may generally be produced more simply and reproducibly with lower risk of fracture.

It is conceivable, for example, as provided in a further design of the invention, that the segments correspond to subsections of the primary reflector along vertical and/or horizontal partition lines.

One possibility is to assemble, for example, the reflector from multiple vertically extending segments.

Of course, as described hereafter, an additional segmenting along one or multiple horizontal partition lines is also possible. One particularly preferred design of the invention relates to a primary reflector which is constructed from such segments, which each only correspond to one subsection of the primary reflector delimited in the vertical and horizontal directions.

According to one preferred design, it is provided that such segments each comprise a horizontally extending middle web facing into the heating duct. Wall sections of the grooves extend from this middle web, which only correspond to a part of the profile of a groove, however. In the simplest case, the wall section defines half of the profile of a groove. In this case, the reflector may be constructed from identical segments, wherein each two segments arranged one over another define a complete groove. In other words, each two segments share one groove in the vertical direction.

The segments can accordingly be placed one against another in the horizontal direction until the desired reflector width is reached.

As mentioned above, it is advantageous if the segments in the claimed design each provide half of the groove profile in each case on both sides of the middle web. A reflector may thus be constructed in a particularly simple manner from identical segments. However, it is also conceivable that the wall sections extending from the middle web are differently dimensioned. The construction of the reflector could also then be performed by identical segments. However, it would be necessary to consider the orientation of the segments accordingly during the assembly, which makes the effort somewhat higher.

Independently thereof, it is an essential advantage in this design of the segments that the middle web can be produced relatively thin, i.e., having the minimum thickness possible during the processing of ceramic materials. If the partition plane, as is also possible, were to extend through the middle web, then both middle web components of the participating adjoining segments would each have to have the corresponding minimum thickness, which would result in an undesired thickness and thus in a correspondingly greater vertical spacing of the thermal radiators. Moreover, it is sufficient in this design to replace one segment in order to vary length and width of the middle web. Length, i.e., the extension in the radiation chamber, and width of the middle web are the two essential adjustment variables which influence the undesired radiator pitch.

In the claimed design, it can furthermore be provided that the free ends of the wall sections of the grooves are beveled. If the segments are joined on one another in the vertical direction, the free ends of the wall sections of the grooves come into contact and then define a diagonally extending gap, through which no or significantly less radiation can pass than would be the case with non-beveled free ends of the groove sections, which would then form a gap aligned with the radiation.

As already mentioned at the outset, a connecting region can be formed on the primary reflector or its segments on its rear side, which is fixable in a counterpart corresponding thereto and arranged on the side wall of the heating module. The connecting region preferably has the shape of a dovetail and the counterpart is a clip made of spring steel.

The invention will be explained in greater detail hereafter on the basis of several figures.

Figure 2:
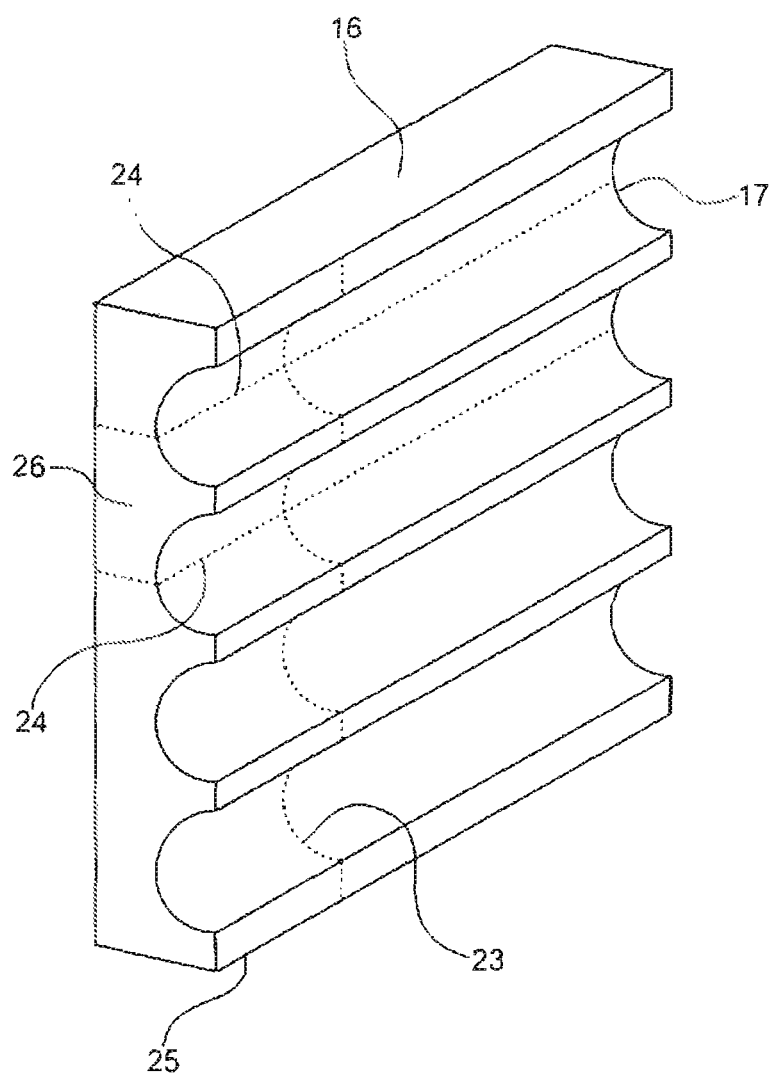
FIG. 2 shows an exemplary embodiment of the reflector.
Figure 3A:
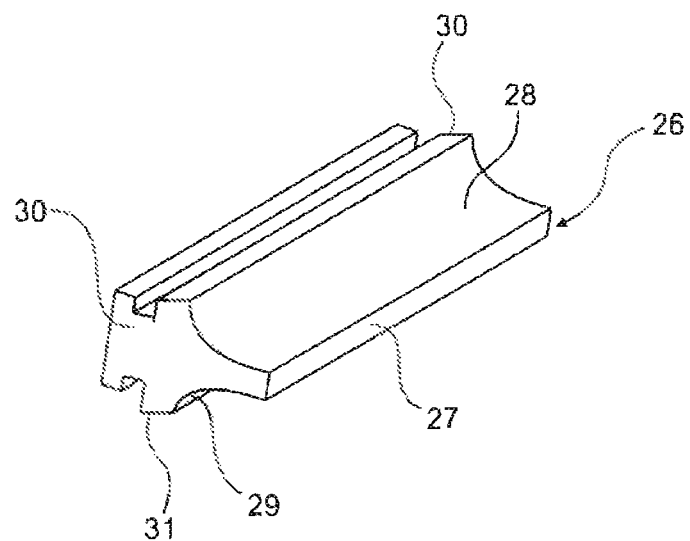
Figure 3B:
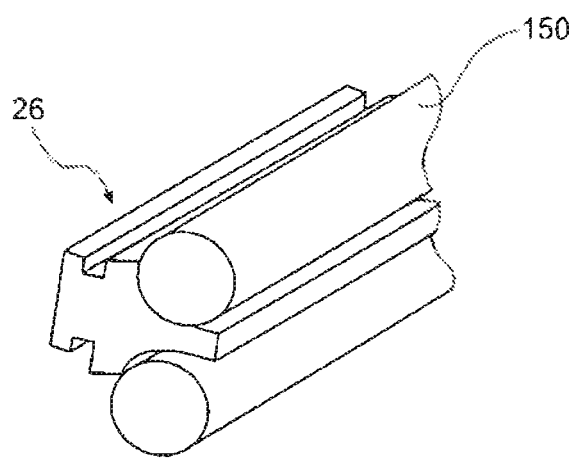
Figure 4A:
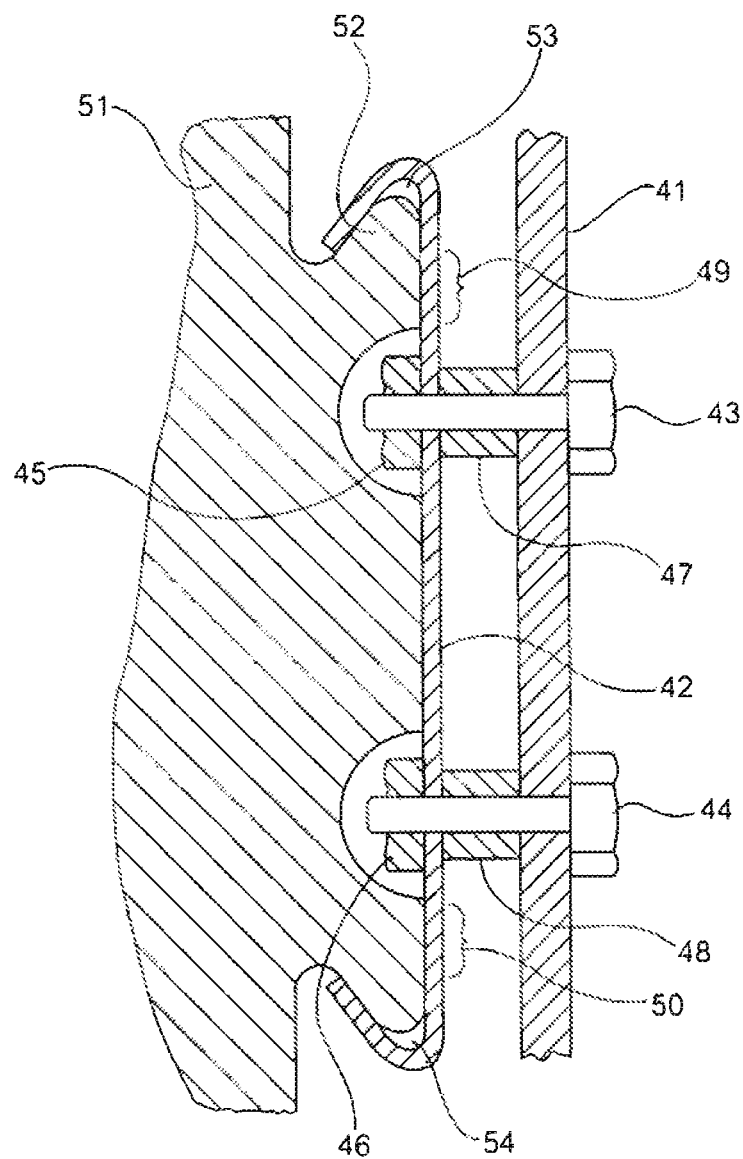
Figure 4B:
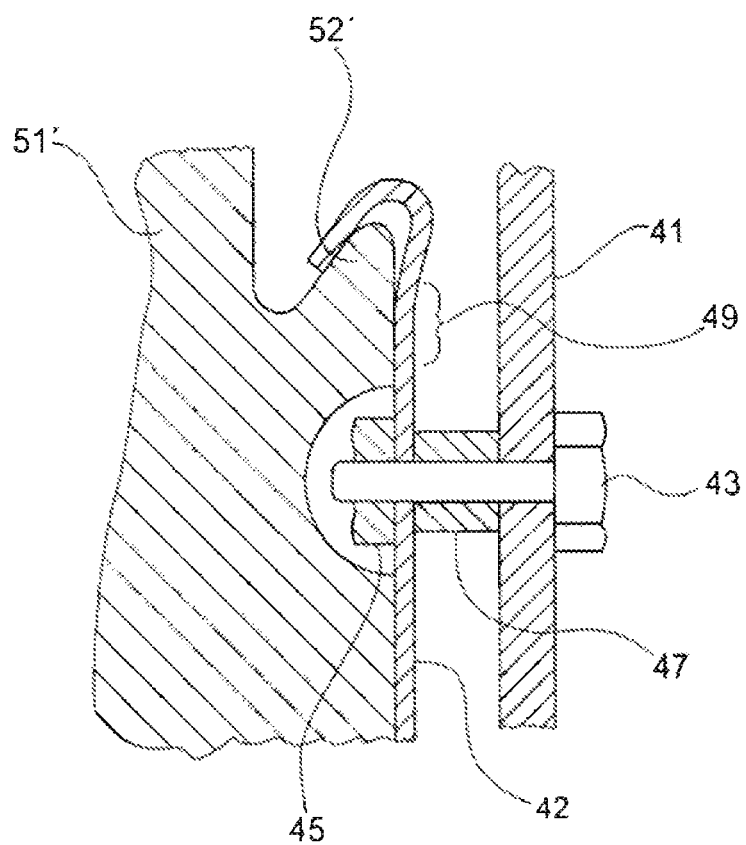

FIG. 3a shows a segment which can be obtained upon segmenting the reflector in FIG. 2 along the horizontal and vertical partition lines, FIG. 3b shows the segment from FIG. 3a having inserted partial regions of thermal radiators, FIG. 4a shows a partial region of the heating module in cross section in which a reflector is connected via a dovetail connection to the side wall of the heating module, and FIG. 4b shows a detail from FIG. 4a, in which the clip is deflected in the bending region.

Figure 1:
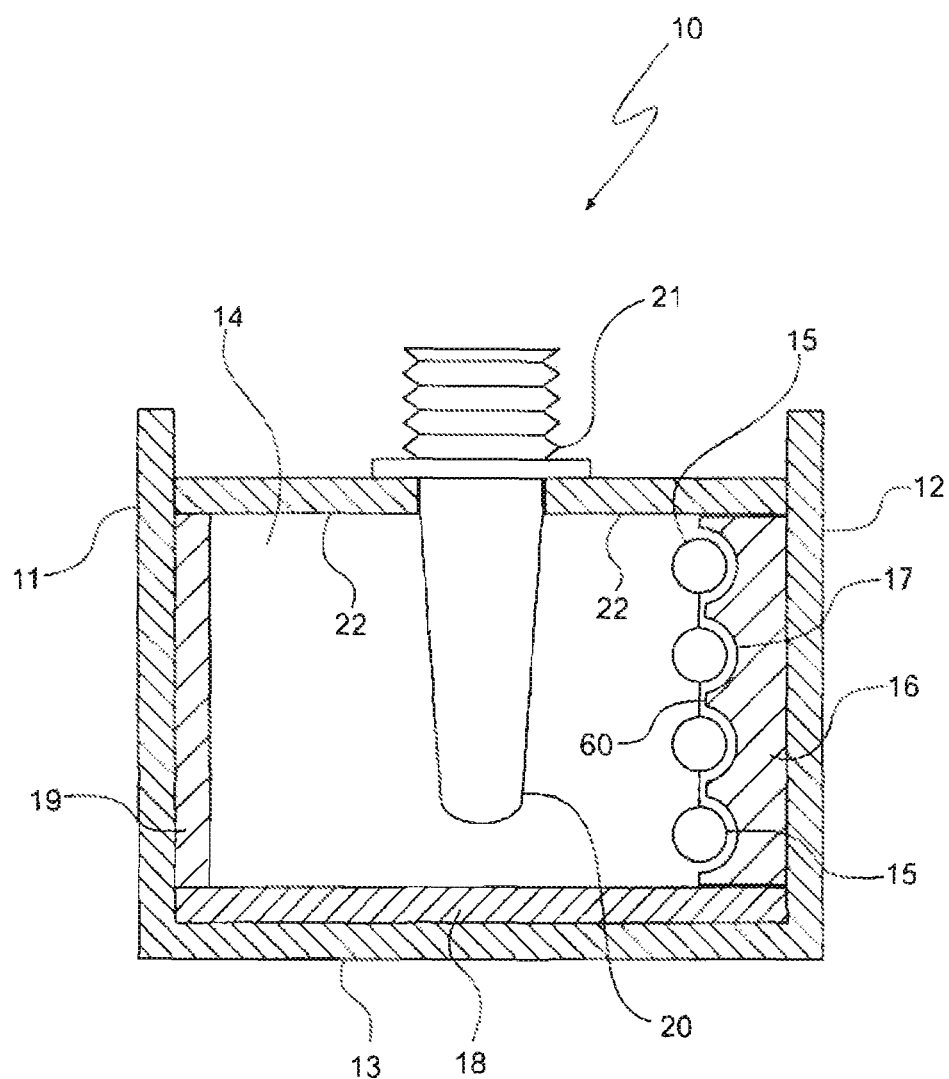
FIG. 1 shows an exemplary embodiment of the heating module in cross section.

FIG. 1 shows a section through a heating module 10, which comprises side walls 11, 12 and a bottom wall 13, which delimit a radiation chamber 14. In the region of the side wall 12, multiple tubular heating units 15 are arranged one over another in the vertical direction along the side wall 12. A primary reflector 16 is arranged between the heating units 15 and the side wall 12, in which grooves 17 separated by webs 60 are formed, which accommodate the heating units 15 and then enclose a part of the circumference of the heating units 15. The heating units 15 and the grooves 17 extend in this case in the horizontal direction along the side wall of the heating module 10 and/or in the transport direction of a heating duct constructed from multiple beating modules.

Furthermore, a bottom reflector 18 covering the bottom wall 13 and a counter reflector 19 covering the side wall 11 are provided. The fastening of the reflectors is not shown. It can be performed in a routine manner, for example, by mounting in a frame and/or by insertion in rails.

A plastic preform 20 is inserted into the heating module 10, which is held in the region of its neck 21 on an upper cover 22 of the heating module 10 and the lower region of which to be formed protrudes into the radiation chamber 14.

FIG. 2 shows the primary reflector 16 from FIG. 1 in a perspective illustration. It can be seen that the grooves 17 extend in the longitudinal direction through the primary reflector 16. The reflector 16 can be fastened on the side wall (not shown) of a heating module in an arbitrary manner, for example, by adhesive bonding or by a connection based on, for example, a tongue and groove, which will be described in greater detail hereafter.

As already stated, the manufacturing of ceramic components becomes more difficult with increasing size. Constructing the primary reflector from multiple segments is therefore provided in a further design of the invention. Vertical and horizontal lines 23 and 24, which are to illustrate the size and configuration of possible segments, are shown in FIG. 2. It is thus possible, for example, to assemble a reflector 16 from multiple vertical subsections 25. The subsection 25 corresponds to the region of the reflector 16 up to the line 23. Multiple such segments 25 joined to one another in the horizontal direction then result in the reflector.

A segment having a configuration along the lines 23 and 24, i.e., delimited both in the horizontal and also in the vertical aspect, is shown in FIG. 3*a*. The segment 26 shown here comprises a middle web 27, from which two wall sections 28 and 29 of a groove extend. A connecting region 30, which enables, for example, an insertion of the segment into a corresponding rail fastened on the side wall, is formed on the end of the segment 26 facing toward the side wall of the heating module.

The segments 26 are arranged one over another and adjacent to one another, wherein each two segments arranged one over another with the wall sections thereof result in a complete groove profile. To avoid radiation losses in the intermediate region between the two segments joined vertically on one another, the free ends 30 and 31 of the wall sections 28 and 29 are formed beveled. In this manner, the gap between the segments lets through no or hardly any radiation. This would be different with non-beveled wall regions. The gap between the segments would then face perpendicularly toward the side wall and would thus be aligned with the radiation of the heating tubes.

FIG. 3*b* shows the segment 26 having thermal radiators 150 arranged therein.

As already stated above, a further aspect of the invention relates to the fastening of the primary reflector on the side wall of the heating module. In this context, FIG. 4*a* shows in the detail a side wall 41 of a heating module (not shown in greater detail). A clip 42 is fixed using screws 43 and 44, which are each screwed into a nut 45, 46, on the side wall 41. Spacers 47, 48 are provided between clip 42 and side wall 41, which set a thermal spacing between clip 42 and side wall 41 and furthermore ensure that the clip 42 has play. Furthermore, the clip has intended bending regions 49, 50, in which primarily an elastic deformation of the clip occurs upon force action. These intended bending regions are implemented in the illustrated exemplary embodiment in that the clip has a pre-bend provided on the production side.

The clip is configured in such a way that it can accommodate a connecting region 52 formed on a primary reflector 51 in the form of a dovetail. In the case shown, the clip 42 is configured in such a way that a gap 53, 54 remains in each case between it and the upper and lower edge, respectively, of the dovetail 52. The clip is thus longer than the dovetail. In the gap 53, 54, the clip 42 thus does not press against the dovetail 52, whereby it is ensured that possibly larger dimensioned connecting regions located in the tolerance range can also still be accommodated without problems in the clip.

FIG. 4*b* shows a detail of FIG. 4*a*. The only difference is that in this case a connecting region 52' is provided, which is dimensioned somewhat longer in vertical extension than that shown in FIG. 4*a*. The result is that the clip 42 is deflected as a result of its pre-tension in the bending region 49 in the direction of the side wall 41 and presses with its free end or leg over a somewhat shorter distance against the connecting region 52' than in FIG. 4*a*. However, a substantial planar contact between clip and connecting region and thus a good fixing of the reflector is also ensured in this case.

In both exemplary embodiments of FIGS. 4*a* and 4*b*, it is provided that the clip is dimensioned longer than the dovetail, i.e., the region of the clip between its legs is longer than the distance between upper edge and lower edge of the dovetail. This dimensioning assists the bending properties of the clip.

It is obvious that the bottom reflector and counter reflector typically provided in heating modules can also be fastened in the heating module correspondingly as shown for the primary reflector in FIGS. 4*a* and 4*b*.

The invention claimed is:

1. A heating module of a heating duct of a molding machine for producing containers from heated thermoplastic preforms, the heating module comprising:
    a first side wall;
    an opposing second side wall;
    a plurality of tubular heating units, which emit infrared radiation; and
    a primary reflector fastened on the first side wall between the plurality of tubular heating units and the first side wall;
    wherein the plurality of tubular heating units are arranged in parallel and one above another,
    wherein at least the primary reflector consists of ceramic material,
    wherein the primary reflector has a connecting region in a form of a dovetail, and
    wherein the primary reflector is fastened on the first side wall with a clip made of steel having dimensions adapted to engage the dovetail.

2. The heating module according to claim 1,
    wherein the heating module further comprises a bottom and an upper cover.

3. The heating module according to claim 2,
    wherein a bottom reflector is provided on the bottom and a counter reflector is provided on the second side wall.

4. The heating module according to claim 1,
    wherein the clip is made of spring steel.

5. The heating module according to claim 3,
    wherein the bottom reflector and the counter reflector consist of ceramic material, and wherein the bottom reflector and the counter reflector are connected with clips made of steel via dovetail connections to the bottom and the second side wall, respectively.

6. The heating module according to claim 1, wherein the clip has predetermined bending regions wherein the clip primarily bends upon the application of force.

7. The heating module according to claim 1, wherein the clip is longer than the dovetail in the primary reflector to be held by it.

8. The heating module according to claim 7, wherein the clip is 1% to 15% longer than the dovetail in the primary reflector.

9. The heating module according to claim 1, wherein the primary reflector is formed of multiple segments, each of which are connected via a dovetail connection to the first side wall.

10. A primary reflector for a heating module of a heating duct of a molding machine for producing containers from heated thermoplastic preforms, which is adapted to be provided between a first side wall of the heating module and a plurality of tubular heating units, which emit infrared radiation, and which are arranged in parallel and one above another, wherein:

the primary reflector consists of ceramic material;

the primary reflector includes a plurality of grooves, each of which is defined by a groove wall;

each of said plurality of grooves is dimensioned such that a respective one of the tubular heating units of the heating module is positionable relative to the primary reflector such that the groove wall surrounds a part of the circumference of the respective one of the tubular heating units;

wherein the primary reflector is constructed of multiple segments;

wherein each of the multiple segments corresponds to subsections of the primary reflector along vertically and/or horizontally extending partition lines;

wherein the each of the multiple segments corresponds to subsections delimited in horizontal and vertical directions relative to the plurality of grooves, said grooves defining the horizontal direction; and wherein the each of the multiple segments comprises a horizontally extending middle web configured to face into the heating channel, which separates two long sides that each form one wall section that defines half of a complete groove.

11. The primary reflector according to claim 10, wherein free ends of the wall sections are provided with corresponding bevels on both sides.

12. The primary reflector according to claim 10, wherein a connecting region, which is fixable in a counterpart corresponding thereto and arranged on the first side wall, is formed on a rear side of the primary reflector.

13. The primary reflector according to claim 12, wherein the connecting region has the shape of a dovetail and the counterpart is a clip made of spring steel.

\* \* \* \* \*